United States Patent
Jurik et al.

(10) Patent No.: US 10,408,402 B2
(45) Date of Patent: Sep. 10, 2019

(54) OPTICAL SYSTEM FOR A LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 163 days.

(21) Appl. No.: 15/078,805

(22) Filed: Mar. 23, 2016

(65) Prior Publication Data

US 2017/0074476 A1   Mar. 16, 2017
US 2019/0195446 A9   Jun. 27, 2019

Related U.S. Application Data (63) Continuation-in-part of application No. 15/024,008, filed as application No. PCT/US2015/019748 on
(Continued)

(51) Int. Cl.
| | |
|---|---|
| *F21S 10/00* | (2006.01) |
| *F21V 13/04* | (2006.01) |
| *F21V 5/00* | (2018.01) |
| *F21V 14/06* | (2006.01) |
| *F21V 21/30* | (2006.01) |
| *G02B 19/00* | (2006.01) |
| *F21V 7/00* | (2006.01) |
| *F21V 5/02* | (2006.01) |

(Continued)

(52) U.S. Cl.
CPC ............ *F21S 10/007* (2013.01); *F21V 5/008* (2013.01); *F21V 13/04* (2013.01); *F21V 14/06* (2013.01); *F21V 21/30* (2013.01); *G02B 19/00* (2013.01); *F21V 5/02* (2013.01); *F21V 7/0091* (2013.01); *F21V 7/041* (2013.01); *F21V 7/043* (2013.01); *F21W 2131/406* (2013.01); *F21Y 2113/13* (2016.08); *F21Y 2115/10* (2016.08)

(58) Field of Classification Search
CPC ...... F21S 10/007; F21V 7/0091; F21V 14/06; F21W 2131/406
See application file for complete search history.

(56) References Cited

U.S. PATENT DOCUMENTS

| | | | | |
|---|---|---|---|---|
| 6,527,411 | B1 * | 3/2003 | Sayers | .................... F21V 5/007 362/245 |
| 7,950,821 | B1 | 5/2011 | Georgitsis et al. | |

(Continued)

FOREIGN PATENT DOCUMENTS

| | | |
|---|---|---|
| CN | 102937258 A | 2/2013 |
| EP | 2112425 A1 | 10/2009 |

(Continued)

OTHER PUBLICATIONS

"Infinity iB-2R manual"; https://www.warmlight.at/media/pdf/41531_MANUAL_GB_V1.pdf; Aug. 25, 2014; 36 pages.
(Continued)

*Primary Examiner* — Julie A Bannan
(74) *Attorney, Agent, or Firm* — Conley Rose, P.C.; Grant Rodolph; Brooks W Taylor (57) ABSTRACT

Single multi-die LED light homogenizer source for an automated multiparmeter luminaire.

18 Claims, 10 Drawing Sheets

Related U.S. Application Data

Mar. 10, 2015, now abandoned, application No. 15/078,805, which is a continuation-in-part of application No. 14/682,834, filed on Apr. 9, 2015, now abandoned.

(60) Provisional application No. 61/950,403, filed on Mar. 10, 2014.

(51) Int. Cl.
*F21V 7/04* (2006.01)
*F21W 131/406* (2006.01)
*F21Y 115/10* (2016.01)
*F21Y 113/13* (2016.01)

(56) References Cited

U.S. PATENT DOCUMENTS

| | | |
|---|---|---|
| 2005/0286250 A1 | 12/2005 | Tanaka et al. |
| 2006/0139918 A1 | 6/2006 | Dolgin et al. |
| 2006/0181872 A1* | 8/2006 | Pashley ............... G02B 6/0001 362/231 |
| 2008/0002413 A1 | 1/2008 | Wang et al. |
| 2008/0062681 A1 | 3/2008 | Belliveau et al. |
| 2008/0068839 A1 | 3/2008 | Matheson |
| 2008/0170391 A1 | 7/2008 | Norridathul et al. |
| 2008/0247024 A1 | 10/2008 | Jurik |
| 2009/0073710 A1* | 3/2009 | Sormani ............... G02B 6/0028 362/509 |
| 2009/0122548 A1* | 5/2009 | Dalsgaard ............. F21S 10/007 362/282 |
| 2009/0296390 A1 | 12/2009 | Dubord |
| 2010/0097802 A1* | 4/2010 | Jurik .................. G02B 27/0994 362/235 |
| 2010/0097808 A1* | 4/2010 | Junk ....................... F21V 21/15 362/296.01 |
| 2010/0103663 A1 | 4/2010 | Kubis et al. |
| 2010/0188018 A1* | 7/2010 | Salm ......................... F21V 7/00 315/294 |
| 2010/0208475 A1* | 8/2010 | Sherman .............. F21S 10/007 362/418 |
| 2010/0214782 A1 | 8/2010 | Allegri |
| 2010/0246196 A1 | 9/2010 | Jurik |
| 2011/0249435 A1 | 10/2011 | Jurik et al. |
| 2012/0049221 A1 | 3/2012 | Ke et al. |
| 2012/0140463 A1* | 6/2012 | Kinzer .................. F21V 7/0091 362/231 |
| 2012/0140474 A1 | 6/2012 | Jurik et al. |
| 2012/0243215 A1 | 9/2012 | Jurik |
| 2012/0287627 A1 | 11/2012 | Campbell et al. |
| 2013/0155671 A1* | 6/2013 | Kurt ........................ F21K 9/00 362/231 |
| 2013/0163239 A1* | 6/2013 | Tukker .................. F21S 10/007 362/231 |
| 2013/0170222 A1 | 7/2013 | Lin et al. |
| 2013/0329413 A1 | 12/2013 | Cotta, Sr. et al. |
| 2014/0301071 A1 | 10/2014 | Jorgensen et al. |
| 2016/0246040 A1 | 8/2016 | Jurik et al. |
| 2016/0298829 A1 | 10/2016 | Jurik et al. |
| 2017/0074489 A1 | 3/2017 | Jurik et al. |

FOREIGN PATENT DOCUMENTS

| | | | |
|---|---|---|---|
| FR | 2981432 A1 | 4/2013 | |
| WO | 2008148362 A2 | 12/2008 | |
| WO | 2012004760 A1 | 1/2012 | |
| WO | WO 2012032455 A1 * | 3/2012 | ............... F21K 9/00 |
| WO | WO 2012032465 A2 * | 3/2012 | ........... F21S 10/007 |
| WO | 2013142434 A2 | 9/2013 | |
| WO | 2013142437 A1 | 9/2013 | |
| WO | 2013184600 A1 | 12/2013 | |
| WO | 2014031641 A2 | 2/2014 | |
| WO | 2015022644 A1 | 2/2015 | |
| WO | 2015138483 A2 | 9/2015 | |

OTHER PUBLICATIONS

Office Action dated Jul. 29, 2016; U.S. Appl. No. 14/682,834, filed Apr. 9, 2015; 9 pages.
Final Office Action dated Mar. 17, 2017; U.S. Appl. No. 14/682,834, filed Apr. 9, 2015; 13 pages.
Office Action dated Jan. 30, 2018; U.S. Appl. No. 15/078,739, filed Mar. 23, 2016; 8 pages.
PCT International Search Report; Application No. PCT/US2016/026838; dated Oct. 11, 2016; 7 pages.
PCT Written Opinion of the International Searching Authority; Application No. PCT/US2016/026838; dated Oct. 11, 2016; 10 pages.
PCT International Search Report; Application No. PCT/US2015/019748; dated Sep. 15, 2015; 5 pages.
PCT Written Opinion of the International Searching Authority; Application No. PCT/US2015/019748; dated Sep. 15, 2015; 5 pages.
PCT International Search Report; Application No. PCT/US2017/023865; dated Jul. 20, 2017; 4 pages.
PCT Written Opinion of the International Searching Authority; Application No. PCT/US2017/023865; dated Jul. 20, 2017; 9 pages.
PCT International Search Report; Application No. PCT/US2017/023871; dated Sep. 12, 2017; 3 pages.
PCT Written Opinion of the International Searching Authority; Application No. PCT/US2017/023871; dated Sep. 12, 2017; 4 pages.
Final Office Action dated Jul. 25, 2018; U.S. Appl. No. 15/078,739, filed Mar. 23, 2016; 22 pages.
Office Action dated May 10, 2019; U.S. Appl. No. 15/565,651, filed Oct. 10, 2017; 7 pages.

* cited by examiner

OPTICAL SYSTEM FOR A LED LUMINAIRE

CROSS-REFERENCE TO RELATED APPLICATIONS

This application is a continuation in part of U.S. patent application Ser. No. 15/024,008 filed Mar. 22, 2016 by Pavel Jurik, et al. entitled, "Optical System for an LED Luminaire", which is a National Stage of International Application No. PCT/US2015/019748 filed Mar. 10, 2015 by Pavel Jurik, et al. entitled, "Optical System for an LED Luminaire", which claims priority to U.S. Provisional Application No. 61/950,403 filed Mar. 10, 2014 by Pavel Jurik, et al. entitled, "Optical System for an LED Luminaire". U.S. patent application Ser. No. 15/078,805 is also a continuation in part of U.S. patent application Ser. No. 14/682,834 filed Apr. 9, 2015 by Pavel Jurik, et al. entitled "System and Method for Controlling Light Output in a LED Luminaire", which claims priority to U.S. Provisional Application No. 62/133,956 filed Mar. 16, 2015 by Pavel Jurik, et al. entitled "System and Method for Controlling Light Output in a LED Luminaire".

TECHNICAL FIELD OF THE INVENTION

The present invention generally relates to an automated luminaire, specifically to an optical system in an automated light-emitting diode (LED) luminaire.

BACKGROUND OF THE INVENTION

Luminaires with automated and remotely controllable functionality are well known in the entertainment and architectural lighting markets. Such products are commonly used in theatres, television studios, concerts, theme parks, night clubs and other venues. A typical product will commonly provide control over the pan and tilt functions of the luminaire allowing the operator to control the direction the luminaire is pointing and thus the position of the light beam on the stage or in the studio. Typically, this position control is done via control of the luminaire's position in two orthogonal rotational axes, usually referred to as pan and tilt. Many products provide control over other parameters such as the intensity, color, focus, beam size, beam shape, and beam pattern. The beam pattern is often provided by a stencil or slide called a gobo which may be a steel, aluminum, or etched glass pattern. The products manufactured by Robe Show Lighting such as the Robin MMX Spot are typical of the art.

Figure 1:
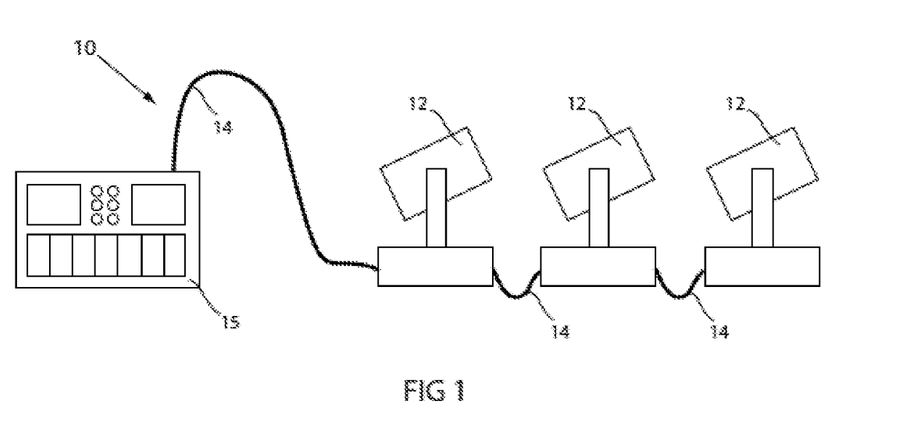
FIG. 1 illustrates a typical automated lighting system.

The optical systems of such automated luminaires may be designed such that a very narrow output beam is produced so that the units may be used with long throws or for almost parallel light laser like effects. These optics are often called Beam' optics. To form this narrow beam with the large light sources in the prior art, the output lens either needed to be very large with a large separation between the lens and the gobos or of a short focal length and much closer to the gobos FIG. 1 illustrates a multiparameter automated luminaire system 10. These systems commonly include a plurality of multiparameter automated luminaires 12 which typically each contain on-board a light source (not shown), light modulation devices, electric motors coupled to mechanical drive systems, and control electronics (not shown). In addition to being connected to mains power either directly or through a power distribution system (not shown), each luminaire 12 is connected in series or in parallel to data link 14 to one or more control desks 15. The luminaire system 10 is typically controlled by an operator through the control desk 15. Control of the automated luminaires 12 is effectuated by electromechanical devices within the luminaires 12 and electronic circuitry including firmware and software within the control desk 15 and/or the luminaires 12. In many of the figures herein, important parts like electromechanical components such as motors and electronic circuitry including software and firmware and some hardware are not shown in order to simplify the drawings so as to teach how to practice the inventions taught herein. Persons of skill in the art will recognize the need for these parts and should be able to readily fill in these parts.

In prior art luminaires, lamps with extremely small light sources have been developed. These lamps often use a very short arc gap, of the order of 1 millimeter (mm), between two electrodes as the light producing means. These lamps may be used for producing a very narrow beam as their source etendue is low, and the size of the lenses and optical systems to collimate the light from such a small source can be substantially reduced. However, the short arc and small light source coupled with the short focal length, and thus large light beam angles, of the reflector also tend to produce substantial amounts of unwanted and objectionable spill light which can escape between gobos or around the dimming shutters. Further, arc lamps require very high voltages in order to ignite the lamp, and can produce dangerous amounts of heat and ultraviolet (UV) energy, which needs to be filtered out. In recent times, LED emitters have become available that are small enough and powerful enough to be used in this kind of luminaire. However, they need improvements to their design to improve the homogenizing and collimation of their optical systems.

There is an increased need for an improved automated luminaire utilizing an LED light source capable of producing both very narrow output beams and of projecting images.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to an automated luminaire, specifically to an optical system in an automated LED luminaire.

Figure 2A:
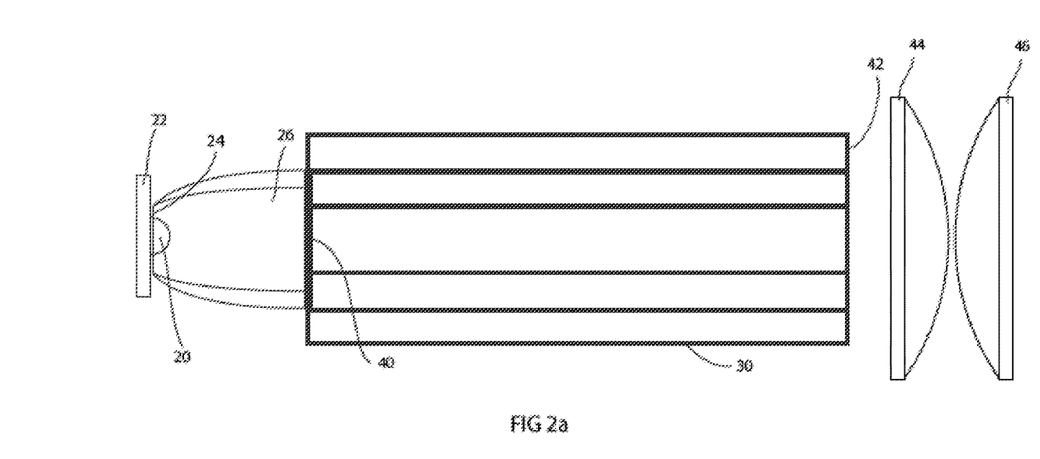
FIG. 2a illustrates an embodiment of an improved light module for an automated luminaire.

FIG. 2a illustrates the light module of an embodiment of the invention where an LED light source 24 is mounted to a support and heat sink 22. LED light source 24 may be fitted with its own optical element 20. Optical element 26 is an optional component in the system and, although illustrated here as a reflector, may be a reflector, total internal reflection (TIR) lens, lens, lens array, micro-lens array, holographic grating, diffractive grating, diffuser, or other optical device known in the art the purpose of which is to control and direct the light from LED light source 24 towards an entry port 40 of light integrator 30. LED light source 24 may contain a single LED die or an array of LED dies utilizing the same optical element 20. Such arrays of LED dies within LED light source 24 may be of a single color and type or may be of multiple colors, such as a mix of Red, Green and Blue LEDs. Any number and mix of colors of LED dies may be used within LED light source 24 without departing from the spirit of the invention. In a particular embodiment, LED light source 24 may comprise a single multi-chip die containing separate red, green, blue, and white LED dies with a single primary optical element 20.

Light integrator 30 is a device utilizing internal reflection so as to homogenize and constrain the light from LED light source 24. Light integrator 30 may be a hollow tube with a reflective inner surface such that light impinging into the entry port may be reflected multiple times along the tube before leaving at an exit port 42. As the light is reflected down the tube in different directions from LED light source 24 the light beams will mix, forming a composite beam where different colors of light are homogenized and an evenly colored beam is emitted. Light integrator 30 may be a square tube, a hexagonal tube, a circular tube, an octagonal tube, or a tube of any cross section known in the art. In a further embodiment, light integrator 30 may be a solid rod constructed of glass, transparent plastic or other optically transparent material where the reflection of the incident light beam within the rod is due to TIR from the interface between the material of the rod and the surrounding air. Such integrating rods are well known in the art from their use in video projection illumination systems and may be circular or other polygonal shape in cross section.

The homogenized light exits the exit port 42 of the light integrator 30 and may then be further controlled and directed by optical systems 44 and 46. Optical systems 44 and 46 may be condensing lenses designed to produce an even illumination for downstream optics, or may be lenses that are adjustable to control the beam of the resultant light.

Figure 2B:
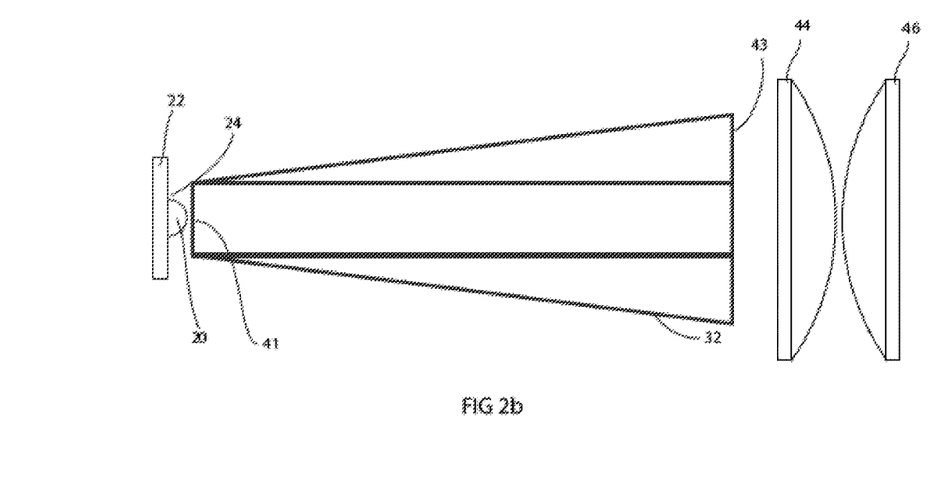
FIG. 2b illustrates an alternative embodiment of an improved light module for an automated luminaire.

FIG. 2b illustrates an alternative light module of an embodiment of the invention where an LED light source 24 is mounted to a support and heat sink 22. LED light source 24 may be fitted with its own optical element 20. LED light source 24 may contain a single LED die or an array of LED dies utilizing the same optical element 20. Such arrays of LED dies within LED light source 24 may be of a single color and type or may be of multiple colors such as a mix of Red, Green, and Blue LEDs. Any number and mix of colors of LED dies may be used within LED light source 24 without departing from the spirit of the invention. In a particular embodiment, LED light source 24 may comprise a single multi-chip die containing separate red, green, blue, and white LED dies with a single primary optical element 20.

Light integrator 32 is a device utilizing internal reflection so as to homogenize and constrain the light from LED light source 24. Light integrator 32 may be a hollow tube with a reflective inner surface such that light impinging into an entry port 41 may be reflected multiple times along the tube before leaving at an exit port 43. As the light is reflected down the tube in different directions from LED light source 24 the light beams will mix forming a composite beam where different colors of light are homogenized and an evenly colored beam is emitted. Light integrator 32 may be a square tube, a hexagonal tube, a circular tube, an octagonal tube or a tube of any cross section known in the art. In a further embodiment, light integrator 32 may be a solid rod constructed of glass, transparent plastic, or other optically transparent material where the reflection of the incident light beam within the rod is due to TIR from the interface between the material of the rod and the surrounding air. Such integrating rods are well known in the art from their use in video projection illumination systems and may be circular or other polygonal shape in cross section. Light integrator 32 may be tapered as shown here or may have parallel sides. Entry port 41 of light integrator 32 may be of a first cross section and exit port 43 may be of a second cross section. Entry port 41 and exit port 43 may have cross-sections of differing shapes. In one embodiment, entry port 41 is square and exit port 43 is octagonal. However, entry port 41 and exit port 43 may be of any shape.

The homogenized light exits from the light integrator 32 and may then be further controlled and directed by optical systems 44 and 46. Optical systems 44 and 46 may be condensing lenses designed to produce an even illumination for downstream optics, or may be lenses that are adjustable to control the beam of the resultant light.

Figure 3:
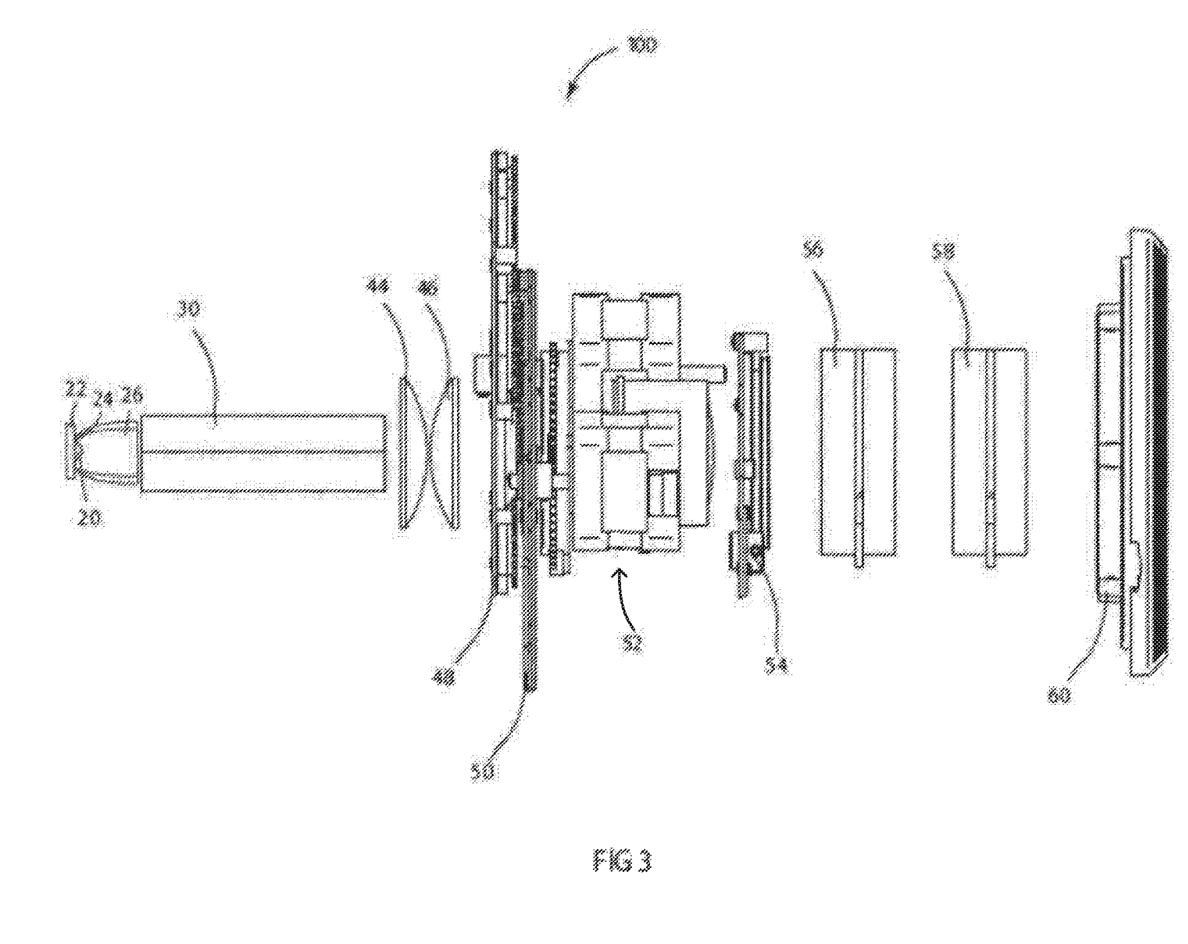
FIG. 3 illustrates an optical system of an embodiment of the invention.

FIG. 3 illustrates an optical system 100 of an embodiment of the invention. The automated luminaire contains an LED light source 24 as described in FIG. 2a that emits a collimated and homogenized light beam through optical systems 44 and 46. The light beam then passes through multiple optical effects systems such as, for example, static gobo system 50, rotating gobo system 48, and prism system 54. The light beam then continues through lenses 56, 58, and 60 which may each individually or cooperatively be capable of movement along the optical axis of the luminaire so as to alter the focus and beam angle or zoom of the light beam.

Static gobo system 50, rotating gobo system 48, and prism system 54 may be driven by motors 52 that may be stepper motors, servo motors, linear actuators, or other motor systems as well known in the art. The luminaire may contain any number or combination of these optical effect systems as well as others such as framing systems, and diffusion systems.

Lenses 56, 58, and 60 may be chosen such that the output light beam from the automated luminaire is adjustable for both zoom and focus by moving any or all of lenses 56, 58, and 60 along the optical axis of the luminaire. In one embodiment of the invention, the lenses 56, 58, and 60 and optical system 100 are designed such that the beam is close to parallel and variable from 1° to 10° in angle. In the 10° position the luminaire will be suitable for gobo projection, while in the 1° position the luminaire will be suitable to be a beam effect projector.

Figure 4:
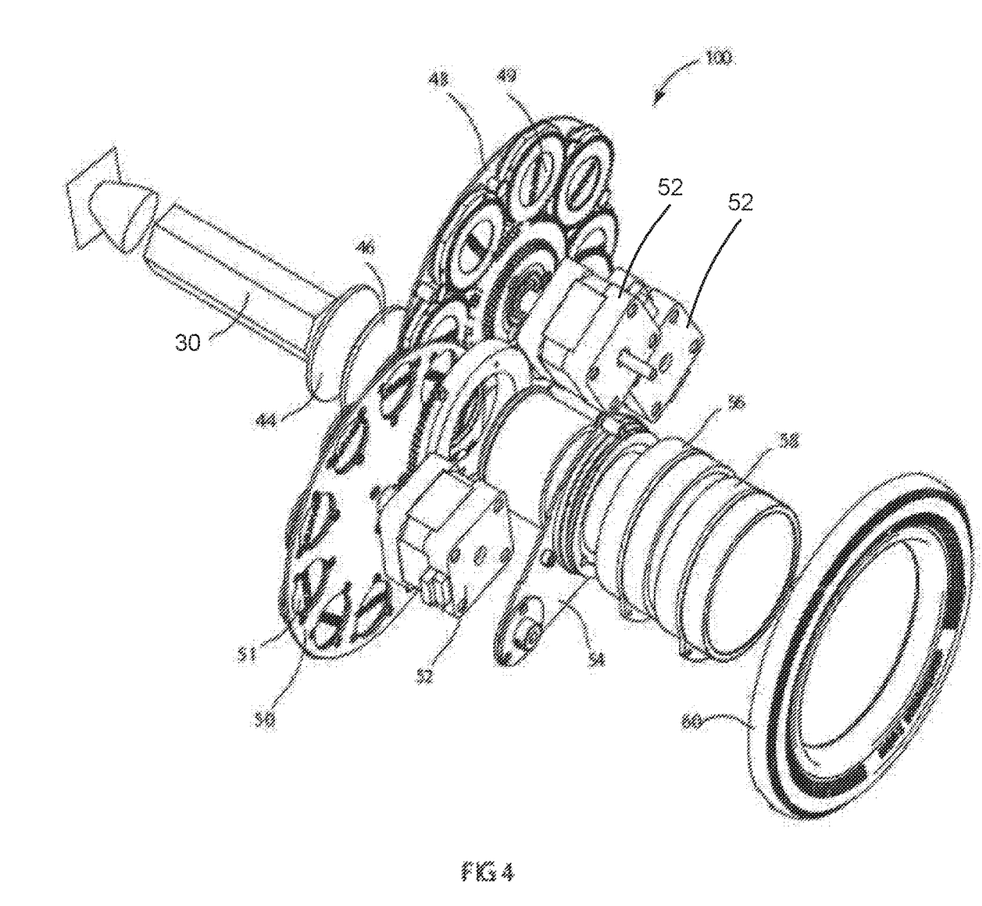
FIG. 4 illustrates an isometric view of the embodiment illustrated in FIG. 3.

FIG. 4 illustrates a isometric view of the embodiment of the invention illustrated in FIG. 3 that more clearly shows the static gobo system 50 containing gobos 51, and rotating gobo system 48 containing gobos 49.

The optical system 100 in FIGS. 3 and 4 has been elongated in illustration along the optical axis for ease of understanding. In practice the optical system 100 may be short from front to back allowing the production of a very compact automated luminaire.

Figure 5:
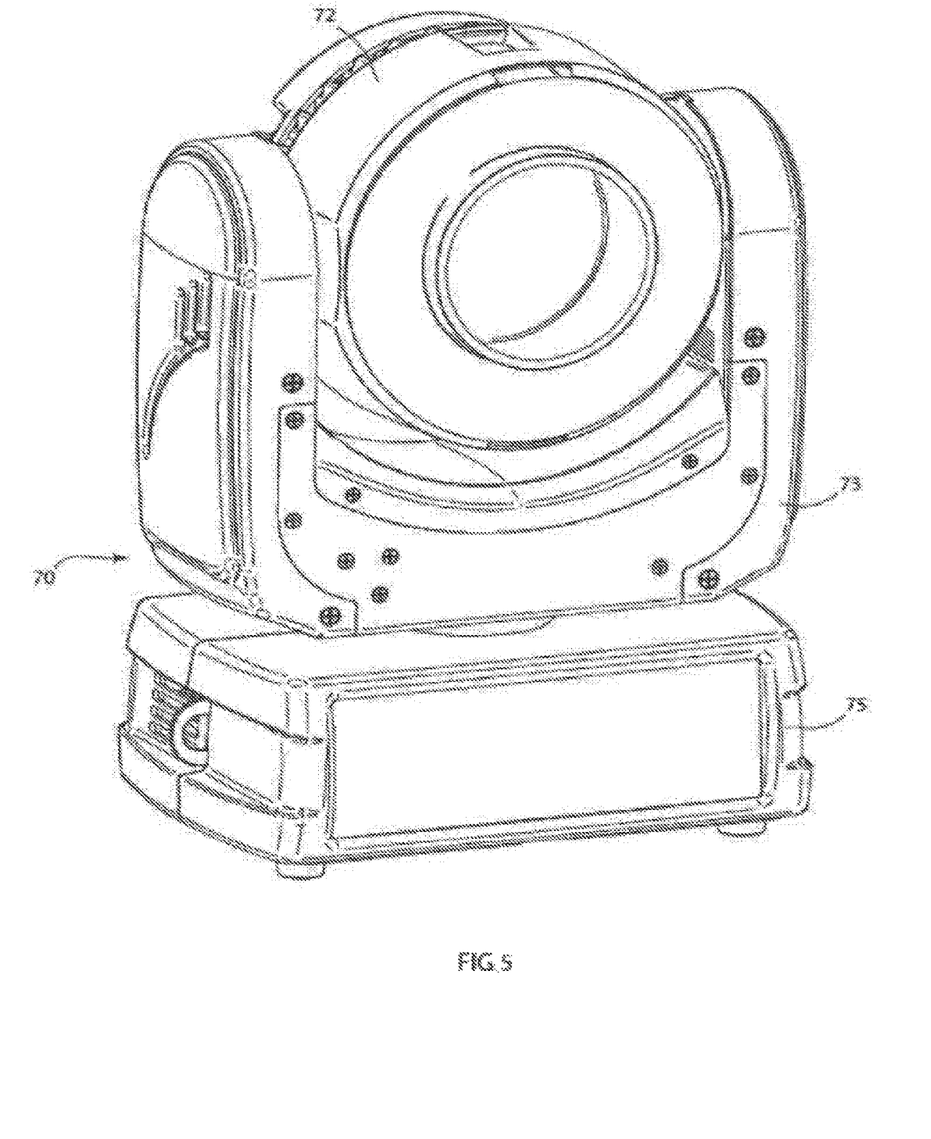
FIG. 5 illustrates an embodiment of an automated luminaire of the invention.

FIG. 5 illustrates an embodiment of an automated luminaire of the invention. Automated luminaire 70 comprises a base 75, rotatably connected to a yoke assembly 73, which in turn is rotatably connected to a head 72. The rotation of yoke assembly 73 relative to the base 75 is often referred to as pan, and rotation of the head 72 relative to yoke assembly 73 is often known as tilt. By combined and coordinated control of pan and tilt motions, the head 72 may be pointed in any desired direction relative to fixed base 75.

Head 72 is fitted with an optical system as described and illustrated in FIGS. 3 and 4 of this document.

FIGS. 6, 7, 8, 9, and 10 illustrate an alternative embodiment of optical system 100 of the invention.

Figure 6:
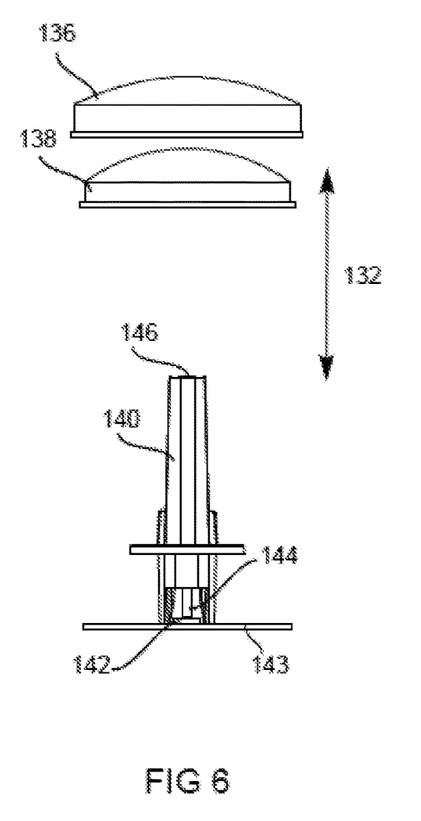
FIGS. 6 and 7 illustrate the operation of the optical system in an alternative embodiment of the invention.
Figure 7:
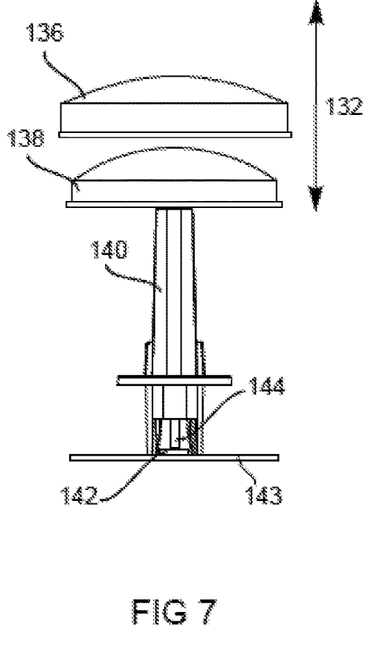

FIGS. 6 and 7 illustrate the operation of the optical system in an alternative embodiment of the invention. A light-emitting module of the system comprises an LED 142, which may include a primary optic, mounted on substrate 143. LED 142 may contain a single color die or may contain multiple dies, each of which may be of differing colors. The light output from the dies in LED 142 enters light integrator optic 144 contained within protective sleeve 140. Light integrator optic 144 may be a device utilizing internal reflection so as to collect, homogenize and constrain, and conduct the light to exit port 146. Light integrator optic 144 may be a hollow tube with a reflective inner surface such that light impinging into the entry port may be reflected multiple times along the tube before leaving at the exit port 146. Light integrator optic 144 may be a square tube, a hexagonal tube, a heptagonal tube, an octagonal tube, a circular tube, or a tube of any other cross section. In a further embodiment, light integrator optic 144 may be a solid rod constructed of glass, transparent plastic or other optically transparent material where the reflection of the incident light beam within the rod is due to TIR from the interface between the material of the rod and the surrounding air. The integrating rod may be a square rod, a hexagonal rod, a heptagonal rod, an octagonal rod, a circular rod, or a rod of any other cross section.

The light exiting light integrator optic 144 will be well homogenized with all the colors of LED 142 mixed together into a single colored light beam. In various embodiments of the invention each LED 142 may comprise a single LED die of a single color or a group of LED dies of the same or differing colors. For example in one embodiment LED 142 may comprise one each of a Red, Green, Blue and White LED die. In further embodiments LED 142 may comprise a single LED chip or package while in yet further embodiments LED 142 may comprise multiple LED chips or packages either under a single primary optic or each package with its own primary optic. In some embodiments, these LED die(s) may be paired with optical lens element(s) as part of the LED light-emitting module. In a further embodiment, LED 142 may comprise more than four colors of LEDs. For example seven colors may be used, one each of a Red, Green, Blue, White, Amber, Cyan, and Deep Blue/UV LED die.

Light integrator optic 144 may advantageously have an aspect ratio where its length is much greater than its diameter. The greater the ratio between length and diameter, the better the resultant mixing and homogenization will be. The precise length is dependent on the placement of LED color dies in the LED array served by the light integrator optic 144 to get homogenization. One configuration may require a greater ratio of length to diameter to another and different configurations may require different input cross-sectional areas, and thus more length to get well mixed output. The shape of the cross sections and changes in the cross sections also affect the length of integrator required. Light integrator optic 144 may be enclosed in a tube or protective sleeve 140 that provides mechanical protection against damage, scratches, and dust.

In further embodiments, the light integrator optic 144, whether solid or hollow, and with any number of sides, may have entry ports and exit ports that differ in shape. For example, a square entry port and an octagonal exit port 146. Further, light integrator optic 144 may have sides which are tapered so that the entrance aperture is smaller than the exit aperture. The advantage of such a structure is that the divergence angle of light exiting the light integrator optic 144 at exit port 146 will be smaller than the divergence angle for light entering the light integrator optic 144. The combination of a smaller divergence angle from a larger aperture serves to conserve the etendue of the system. Thus, a tapered light integrator optic 144 may provide similar functionality to a condensing optical system.

Light exiting light integrator optic 144 is directed towards and through first lens 136 and second lens 138 that serve to further control the angle of the emitted light beam. First lens 136 and second lens 138 may be moved as a pair towards and away from light integrator optic 144 as described above in the direction along the optical axis of the system as shown by arrow 132. In the position shown in FIG. 6 where first lens 136 and second lens 138 are at their furthest separation from the light-emitting module and the exit port 146 of light integrator optic 144, the emitted light beam will have a narrow beam angle. In the position shown in FIG. 7 where first lens 136 and second lens 138 are at their closest distance to the light-emitting module and the exit port 146 of light integrator optic 144, the emitted light beam will have a wide beam angle. Intermediate positions of the lenses 136 and 138 with respect to exit port 146 of light integrator optic 144 will provide intermediate beam angles. In one embodiment of the invention, the range of beam angles from the system may be adjusted from 4° to 50°.

In further embodiments, lenses 136 and 138 may move separately and independently to provide varying beam angle or focus adjustment of the light beam.

Lenses 136 and 138 may be meniscus lenses, plano convex lenses, bi-convex lenses, holographic lenses, or other lenses as well known in the art. Lenses 136 and 138 may be manufactured from glass, acrylic, polycarbonate, or any other material known to be used for optical lenses. Lenses 136 and 138 may be single elements or may each be lenses comprising a plurality of elements. Such elements may be cemented together or air spaced as is well known in the art. Lenses 136 and 138 may be constructed so as to form an achromatic combination. Such a configuration may be desirable such that the differing wavelengths of light from the associated LED light emitting module do not diverge or converge from each other and remain mixed. The design of such achromatic lenses or lens assemblies is well known in the art.

Figure 8:
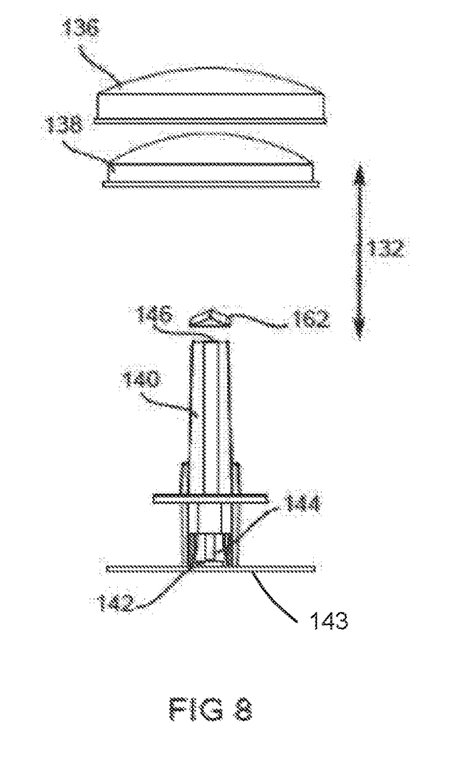
FIGS. 8 and 9 illustrate the operation of the optical system in an embodiment of the invention when fitted with an effect.
Figure 9:
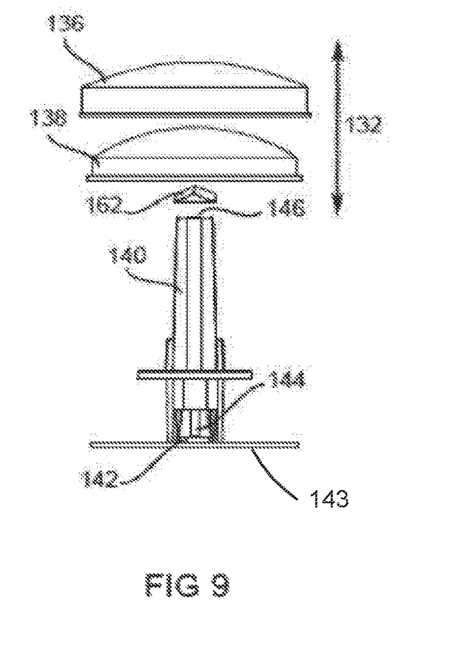

FIGS. 8 and 9 illustrate the operation of the optical system in an embodiment of the invention when fitted with an effect 162. A light-emitting module of the system comprises an LED 142, which may include a primary optic, mounted on substrate 143. LED 142 may contain a single color die or may contain multiple dies, each of which may be of differing colors. The light output from the dies in LED 142 enters light integrator optic 144 contained within protective sleeve 140. Light integrator optic 144 may be a device utilizing internal reflection so as to collect, homogenize and constrain, and conduct the light to exit port 146. Light integrator optic 144 may be a hollow tube with a reflective inner surface such that light impinging into the entry port may be reflected multiple times along the tube before leaving at the exit port 146. Light integrator optic 144 may be a square tube, a hexagonal tube, a heptagonal tube, an octagonal tube, a circular tube, or a tube of any other cross section. In a further embodiment, light integrator optic 144 may be a solid rod constructed of glass, transparent plastic, or other optically transparent material where the reflection of the incident light beam within the rod is due to TIR from the interface between the material of the rod and the surrounding air. The integrating rod may be a square rod, a hexagonal rod, a heptagonal rod, an octagonal rod, a circular rod, or a rod of any other cross section.

The light exiting light integrator optic 144 will be well homogenized with all the colors of LED 142 mixed together into a single colored light beam. In various embodiments of the invention, each LED 142 may comprise a single LED die of a single color or a group of LED dies of the same or differing colors. For example, in one embodiment, LED 142 may comprise one each of a Red, Green, Blue and White LED die or one each of a Red, Green, Blue and Amber LED die. In further embodiments, LED 142 may comprise a single LED chip or package while in yet further embodiments LED 142 may comprise multiple LED chips or packages, either under a single primary optic or each package with its own primary optic. In some embodiments these LED die(s) may be paired with optical lens element(s) as part of the LED light-emitting module. In a further embodiment, LED 142 may comprise more than four colors of LEDs. For example, seven colors may be used, one each of a Red, Green, Blue, White, Amber, Cyan, and Deep Blue/UV LED die.

Light integrator optic 144 may advantageously have an aspect ratio where its length is much greater than its diameter. The greater the ratio between length and diameter, the better the resultant mixing and homogenization will be. Light integrator optic 144 may be enclosed in a tube or protective sleeve 140 that provides mechanical protection against damage, scratches, and dust.

In further embodiments, the light integrator optic 144, whether solid or hollow, and with any number of sides, may have entry ports and exit ports that differ in shape. For example, a square entry port and an octagonal exit port 146. Further, light integrator optic 144 may have sides which are tapered so that the entrance aperture is smaller than the exit aperture. The advantage of such a structure is that the divergence angle of light exiting the light integrator optic 144 at exit port 146 will be smaller than the divergence angle for light entering the light integrator optic 144. The combination of a smaller divergence angle from a larger aperture serves to conserve the etendue of the system. Thus, a tapered light integrator optic 144 may provide similar functionality to a condensing optical system.

Light exiting light integrator optic 144 is directed towards and through effect 162 and then through first lens 136 and second lens 138 that serve to further control the angle of the emitted light beam. First lens 136 and second lens 138 may be moved as a pair towards and away from light integrator optic 144 as described above in the direction along the optical axis of the system as shown by arrow 132. In the position shown in FIG. 8 where first lens 136 and second lens 138 are at their furthest separation from the light-emitting module and the exit port 146 of light integrator optic 144, the emitted light beam will have a narrow beam angle. In the position shown in FIG. 9 where first lens 136 and second lens 138 are at their closest distance to the light-emitting module and the exit port 146 of light integrator optic 144 the emitted light beam will have a wide beam angle. Intermediate positions of the lenses 136 and 138 with respect to exit port 146 of light integrator optic 144 will provide intermediate beam angles. In one embodiment of the invention, the range of beam angles from the system may be adjusted from 4° to 50°.

The introduction of effect 162 may limit how close first lens 136 and second lens 138 may move towards light integrator optic 144. This, in turn, may limit the maximum output angle of the optical system when effect 162 is being utilized.

In further embodiments, lenses 136 and 138 may move separately and independently to provide varying beam angle or focus adjustment of the light beam.

Lenses 136 and 138 may be meniscus lenses, plano convex lenses, bi-convex lenses, holographic lenses, or other lenses as well known in the art. Lenses 136 and 138 may be manufactured from glass, acrylic, polycarbonate, or any other material known to be used for optical lenses. Lenses 136 and 138 may be single elements or may each be lenses comprising a plurality of elements. Such elements may be cemented together or air spaced as is well known in the art. Lenses 136 and 138 may be constructed so as to form an achromatic combination. Such a configuration may be desirable such that the differing wavelengths of light from the associated LED light-emitting module do not diverge or converge from each other and remain mixed. The design of such achromatic lenses or lens assemblies is well known in the art.

Figure 10:
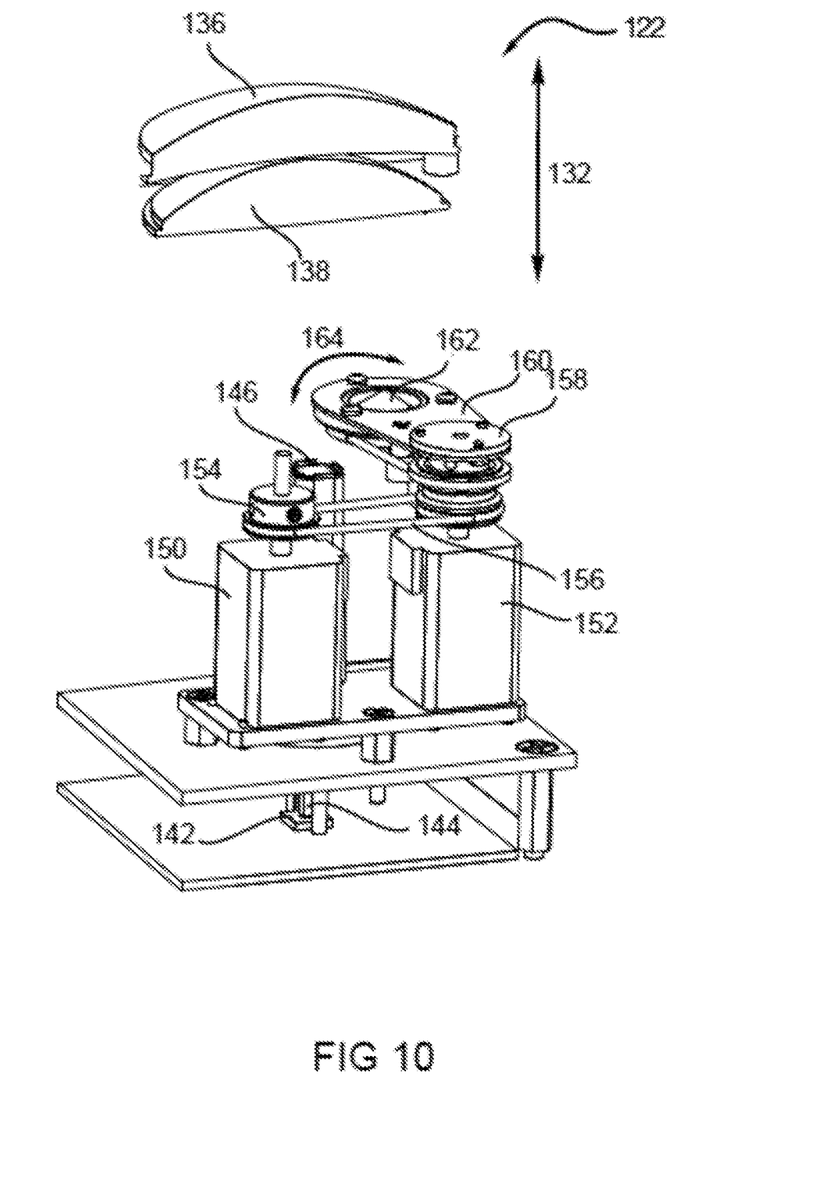
FIG. 10 a lighting effects system that may be fitted to an embodiment of the invention.

FIG. 10 illustrates a lighting effects system that may be fitted to an embodiment of the invention. The light-emitting module comprises, as previously described, LED 142, light integrator optic 144 with exit port 146 contained within a protective sleeve. Associated with this light-emitting module are lenses 136 and 138. The light-emitting module additionally has a lighting effects system. This lighting effects system comprises optical effect 162 that is rotatably mounted in effects carrier arm 160 such that it can rotate as shown by arrow 164. This rotation is effected through motor 150 and pulley system 158. Additionally, the effects carrier arm may be swung into and out of position through motor 152, pulley 154, and belt 156. Through operation of motor 152 optical effect 162 may either be positioned across light exit port 146 or moved away from light exit port 146 and out of the light beam so that it has no effect. Once effect 162 is in position across the light beam, lenses 136 and 138 may be moved along the optical axis, as shown by arrow 132, to alter the beam angle of the light beam, now further modified by effect 162. Motors 150 and 152 may be stepper motors, servo motors, linear actuators, solenoids, direct current (DC) motors, or other mechanisms as well known in the art.

Effect 162 may be a prism, effects glass, gobo, gobo wheel, color, frost, iris or any other optical effect as well known in the art. Effect 162 may comprise a gobo wheel, all or any of which may be individually or cooperatively controlled. In further embodiments, the gobo wheel may not be a complete circle, but may be a portion of a disc, or a flag so as to save space and provide a more limited number of gobo options. The gobo patterns may be of any shape and may include colored images or transparencies. In yet further embodiments, individual gobo patterns may be further rotated about their axes by supplementary motors in order to provide a moving rotating image. Such rotating gobo wheels are well known in the art.

In further embodiments, lenses 136 and 138 may move separately and independently to provide varying beam angle or focus adjustment of the light beam.

Lenses 136 and 138 may be meniscus lenses, plano convex lenses, bi-convex lenses, holographic lenses, or other lenses as well known in the art. Lenses 136 and 138 may be manufactured from glass, acrylic, polycarbonate, or any other material known to be used for optical lenses. Lenses 136 and 138 may be single elements or may each be lenses comprising a plurality of elements. Such elements may be cemented together or air spaced as is well known in the art. Lenses 136 and 138 may be constructed so as to form an achromatic combination. Such a configuration may be desirable such that the differing wavelengths of light from the associated LED light-emitting module do not diverge or converge from each other and remain mixed. The design of such achromatic lenses or lens assemblies is well known in the art.

Figure 11:
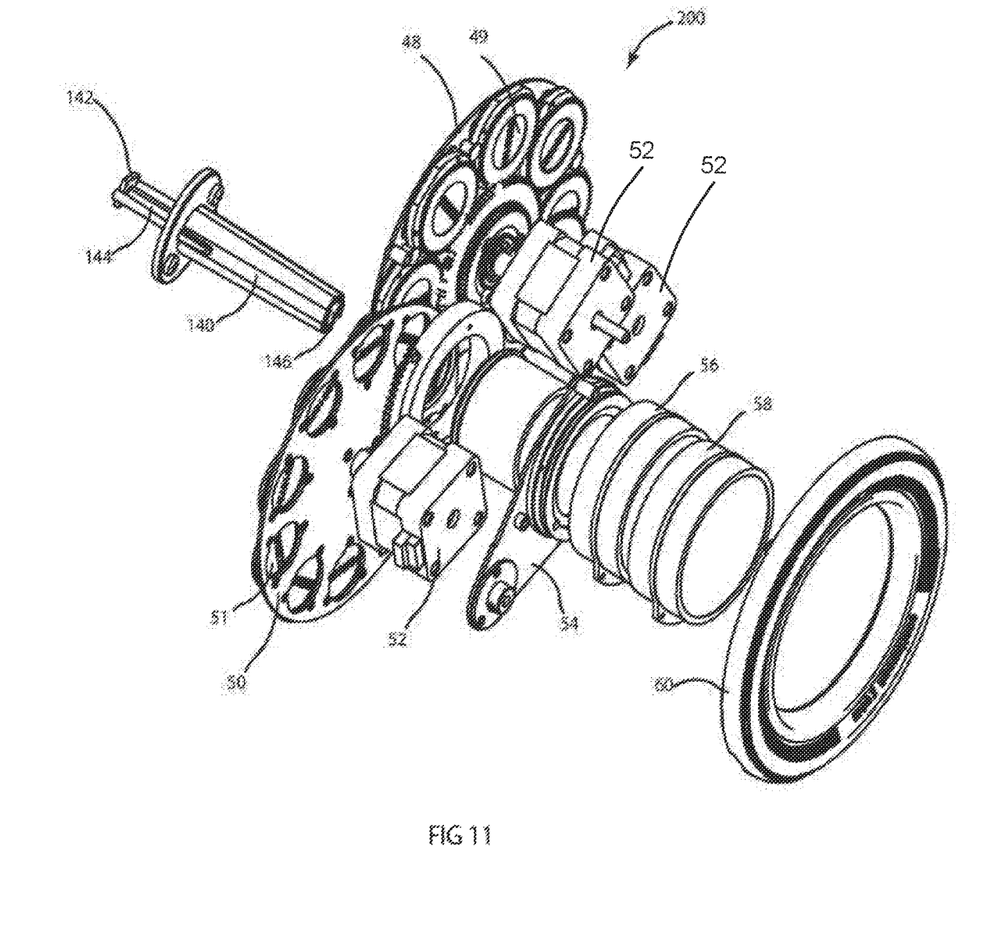
FIGS. 11 and 12 illustrate an optical system of an embodiment of the invention.
Figure 12:
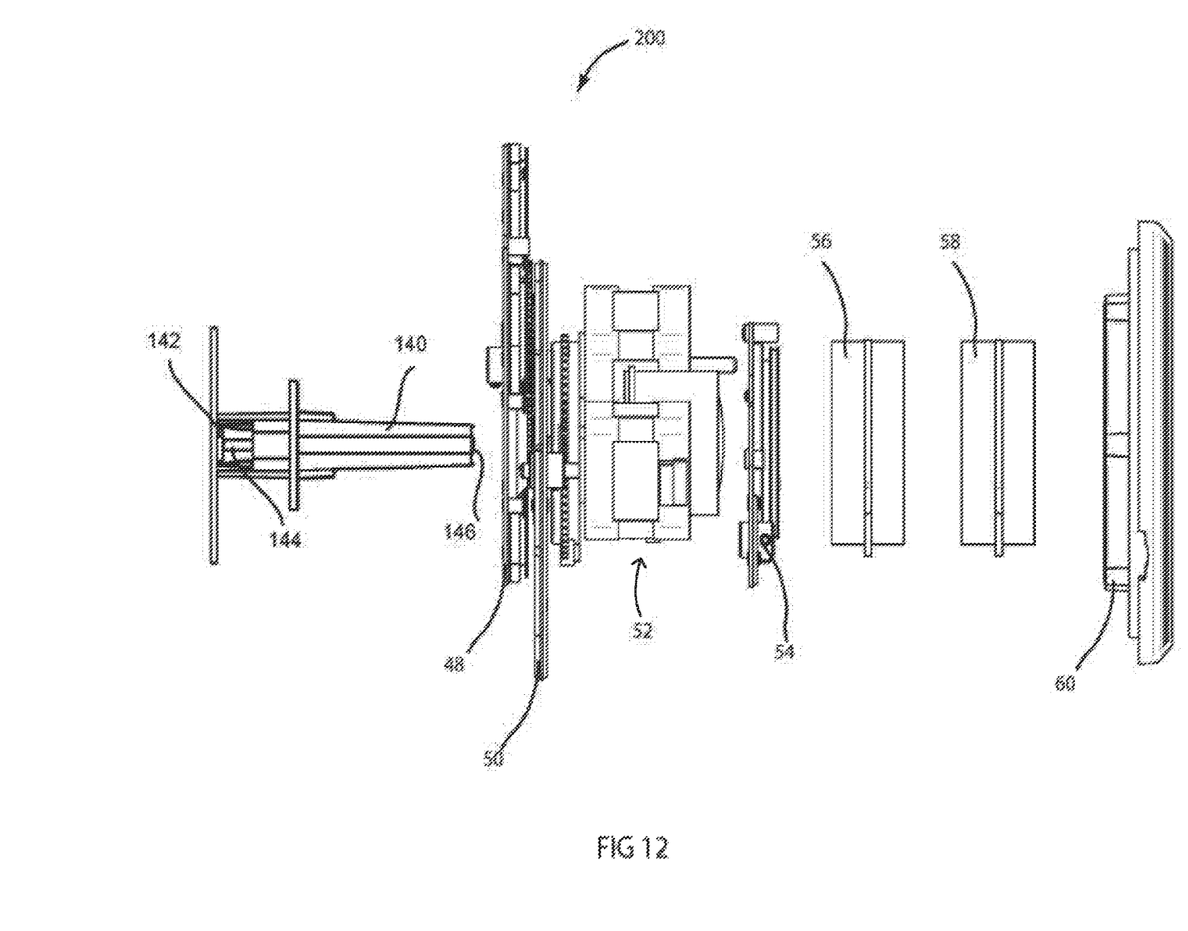

FIGS. 11 and 12 illustrate an optical system 200 of an embodiment of the invention. The automated luminaire contains a light source as described in FIGS. 6 and 7 that emits a collimated and homogenized light beam from exit port 146. The light beam then passes through multiple optical effects systems such as, for example, static gobo system 50 containing gobos 51, rotating gobo system 48 containing gobos 49, and prism system 54. The light beam then continues through lenses 56, 58, and 60 which may each individually or cooperatively be capable of movement along the optical axis of the luminaire so as to alter the focus and beam angle or zoom of the light beam.

Static gobo system 50, rotating gobo system 48, and prism system 54 may be driven by motors 52 that may be stepper motors, servo motors, linear actuators, or other motor systems as well known in the art. The luminaire may contain any number or combination of these optical effect systems as well as others such as framing systems, and diffusion systems.

Lenses 56, 58, and 60 may be chosen such that the output light beam from the automated luminaire is adjustable for both zoom and focus by moving any or all of lenses 56, 58, and 60 along the optical axis of the luminaire. Lenses 56, 58 and 60 may be comprised of meniscus lenses, plano convex lenses, bi-convex lenses, holographic lenses, or other lenses as well known in the art. Lenses 56, 58 and 60 may be manufactured from glass, acrylic, polycarbonate, or any other material known to be used for optical lenses. Lenses 56, 58 and 60 may be single elements or may each be lenses comprising a plurality of elements. Such elements may be cemented together or air spaced as is well known in the art. Lenses 56, 58 and 60 may be constructed so as to form an achromatic combination. Such a configuration may be desirable such that the differing wavelengths of light from the associated LED light-emitting module do not diverge or converge from each other and remain mixed. The design of such achromatic lenses or lens assemblies is well known in the art.

In one embodiment of the invention, the lenses and system are designed such that the beam is close to parallel and variable from 1° to 10° in angle. In the 10° position the luminaire will be suitable for gobo projection, while in the 1° position the luminaire will be suitable to be a beam effect projector.

The optical system 200 in FIGS. 11 and 12 has been elongated in illustration along the optical axis for ease of understanding. In practice the optical system 200 may be short from front to back allowing the production of a very compact automated luminaire.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

We claim:

1. An automated multiparameter luminaire, comprising:
a multi-die light-emitting diode (LED) light source configured to emit a first light beam;
an elongated total internal reflection (TIR) homogenizer having parallel sides, optically coupled to the multi-die LED light source and configured to receive the first light beam and emit a second light beam;
a zoom lens system, configured to receive the second light beam without passing through any intervening lenses and to emit a third light beam, the zoom lens system further configured to alter one or more of a focus, beam angle, or zoom of the third light beam; and
an optical effect system positioned between the elongated TIR homogenizer and the zoom lens system, the optical effect system comprising a prism configured (i) to be moved to a first position in the second light beam and to a second position out of the second light beam, and (ii) to rotate within the second light beam while in the first position.

2. The automated multiparameter luminaire of claim 1, wherein the zoom lens system comprises a plurality of lenses, where at least one of the plurality of lenses is configured to move along an optical axis of the automated multiparameter luminaire.

3. The automated multiparameter luminaire of claim 1, wherein the elongated TIR homogenizer is mounted in a protective sleeve.

4. The automated multiparameter luminaire of claim 1, wherein the elongated TIR homogenizer comprises a hollow tube with a reflective inner surface.

5. The automated multiparameter luminaire of claim 1, further comprising one or more of a static gobo system or a rotating gobo system, positioned between the elongated TIR homogenizer and the optical effect system and configured to modify the second light beam.

6. An automated luminaire, comprising:
a light-emitting diode (LED) light source configured to emit a first light beam;
an elongated total internal reflection (TIR) homogenizer having parallel sides, optically coupled to the LED light source and configured to receive the first light beam and emit a second light beam;
a zoom lens system, configured to receive the second light beam without passing through any intervening lenses and to emit a third light beam, the zoom lens system further configured to alter one or more of a focus, beam angle, or zoom of the third light beam;
an optical effect system positioned between the elongated TIR homogenizer and the zoom lens system, the optical effect system comprising a prism configured (i) to be moved to a first position in the second light beam and to a second position out of the second light beam, and (ii) to rotate within the second light beam while in the first position; and
control electronics configured to control the zoom lens system and the optical effect system.

7. The automated luminaire of claim 6, wherein the zoom lens system comprises a plurality of lenses, where at least one of the plurality of lenses is configured to move along an optical axis of the automated luminaire, and wherein the control electronics are configured to control the movement of the at least one lens.

8. The automated luminaire of claim 6, wherein the elongated TIR homogenizer is mounted in a protective sleeve.

9. The automated luminaire of claim 6, wherein the elongated TIR homogenizer comprises a hollow tube with a reflective inner surface.

10. The automated luminaire of claim 6, further comprising one or more of a static gobo system or a rotating gobo system, positioned between the elongated TIR homogenizer and the optical effect system and configured to modify the second light beam, wherein the control electronics are configured to control the movement of the one or more of the static gobo system or the rotating gobo system.

11. An automated multiparameter luminaire, comprising:
a multi-die light-emitting diode (LED) light source configured to emit a first light beam;
an elongated total internal reflection (TIR) homogenizer, optically coupled to the multi-die LED light source and configured to receive the first light beam and emit a second light beam, the elongated TIR homogenizer comprising an entry port having a first cross-sectional shape and an exit port having a second cross-sectional shape, the first cross-sectional shape having a different number of sides than the second cross-sectional shape; and
a zoom lens system, configured to receive the second light beam without passing through any intervening lenses and to emit a third light beam, the zoom lens system further configured to alter one or more of a focus, beam angle, or zoom of the third light beam.

12. The automated multiparameter luminaire of claim 11, wherein the zoom lens system comprises a plurality of lenses, where at least one of the plurality of lenses is configured to move along an optical axis of the automated multiparameter luminaire.

13. The automated multiparameter luminaire of claim 11, wherein the elongated TIR homogenizer is mounted in a protective sleeve.

14. The automated multiparameter luminaire of claim 11, wherein the elongated TIR homogenizer comprises a hollow tube with a reflective inner surface.

15. The automated multiparameter luminaire of claim 11, further comprising an optical effect system positioned between the elongated TIR homogenizer and the zoom lens system and configured to modify the second light beam, the optical effect system not including a lens.

16. The automated multiparameter luminaire of claim 15, wherein the optical effect system comprises an optical effect configured to be moved to a first position in the second light beam and to a second position out of the second light beam.

17. The automated multiparameter luminaire of claim 16, wherein the optical effect is configured to rotate within the second light beam while in the first position.

18. The automated multiparameter luminaire of claim 17, further comprising one or more of a static gobo system or a rotating gobo system, positioned between the elongated TIR homogenizer and the optical effect system and configured to modify the second light beam.

\* \* \* \* \*